US012804547B2

(12) United States Patent
Abedini et al.

(10) Patent No.: US 12,804,547 B2
(45) Date of Patent: Nov. 17, 2026

(54) CELL WAKE-UP SIGNAL FOR A USER EQUIPMENT OPERATING IN AN IDLE OR INACTIVE MODE

(71) Applicant: QUALCOMM Incorporated, San Diego, CA (US)

(72) Inventors: Navid Abedini, Basking Ridge, NJ (US); Konstantinos Dimou, New York, NY (US); Jianghong Luo, Skillman, NJ (US); Aria Hasanzadezonuzy, Somerville, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 449 days.

(21) Appl. No.: 18/470,836

(22) Filed: Sep. 20, 2023

(65) Prior Publication Data

US 2024/0155498 A1 May 9, 2024

Related U.S. Application Data

(60) Provisional application No. 63/382,452, filed on Nov. 4, 2022.

(51) Int. Cl.

*H04W 52/02* (2009.01)
*H04W 74/0833* (2024.01)

(52) U.S. Cl.

CPC ... *H04W 52/0235* (2013.01); *H04W 74/0833* (2013.01)

(58) Field of Classification Search

CPC ........... H04W 52/028; H04W 74/0833; H04W 52/0235; H04W 52/0206

See application file for complete search history.

(56) References Cited

U.S. PATENT DOCUMENTS

| | | | | |
|---|---|---|---|---|
| 2020/0178172 | A1* | 6/2020 | Thangarasa | H04W 76/28 |
| 2023/0309171 | A1* | 9/2023 | Zhou | H04W 72/23 |
| 2025/0031249 | A1* | 1/2025 | Myung | H04W 72/56 |
| 2025/0048435 | A1* | 2/2025 | Yan | H04W 52/0235 |
| 2025/0063508 | A1* | 2/2025 | Ma | H04W 52/028 |

* cited by examiner

*Primary Examiner* — Marcus Smith
*Assistant Examiner* — Shivakrishna Vallamdasu
(74) *Attorney, Agent, or Firm* — Harrity & Harrity LLP

(57) ABSTRACT

Various aspects of the present disclosure generally relate to wireless communication. In some aspects, a user equipment (UE) may transmit a cell wake-up signal (WUS) indicating that a cell is to switch from operating according to a first mode to operating according to a second mode, the cell WUS including an indication of one or more communications to be transmitted by a network node associated with the cell during operation of the cell in the second mode. The UE may receive the one or more communications from the cell after transmitting the cell WUS. Numerous other aspects are provided.

30 Claims, 8 Drawing Sheets

400

CELL WAKE-UP SIGNAL FOR A USER EQUIPMENT OPERATING IN AN IDLE OR INACTIVE MODE

CROSS-REFERENCE TO RELATED APPLICATION

This Patent Applications claims priority to U.S. Provisional Patent Application No. 63/382,452, filed on Nov. 4, 2022, entitled "CELL WAKE-UP SIGNAL FOR A USER EQUIPMENT OPERATING IN AN IDLE OR INACTIVE MODE," and assigned to the assignee hereof. The disclosure of the prior Application is considered part of and is incorporated by reference into this Patent Applications.

FIELD OF THE DISCLOSURE

Aspects of the present disclosure generally relate to wireless communication and specifically, to a cell wake-up signal (WUS) for a user equipment (UE) operating in an idle or inactive mode.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth or transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different user equipment (UEs) to communicate on a municipal, national, regional, or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

A wireless communication system may support the use of an uplink signal that can be transmitted by a UE in order to trigger a change in an operation mode of a cell. Such a signal is herein referred to as a cell wake-up signal (WUS), but can also be referred to as an uplink WUS or an uplink trigger (ULT). A cell WUS may be utilized to promote network energy saving (NES). In some scenarios, a UE that transmits a cell WUS may be operating according to an idle mode or an inactive mode. In such a scenario, the idle/inactive UE may send a cell WUS to the network node to cause the network node to switch the cell from operating according to a first mode to operating according to a second mode. However, operations that need to be performed by the cell during operation of the cell according to the second mode may vary depending on a need of a given idle/inactive UE that sends a cell WUS. Therefore, operation of the cell according to the second mode may not provide optimal energy savings depending on a need of a given idle/inactive UE that sends a cell WUS.

SUMMARY

Some aspects described herein relate to a user equipment (UE) for wireless communication. The user equipment may include a processing system that includes one or more processors and one or more memories coupled to the one or more processors. The processing system may be configured to cause the UE to transmit a cell wake-up signal (WUS) indicating that a cell is to switch from operating according to a first mode to operating according to a second mode, the cell WUS including an indication of one or more communications to be transmitted by a network node associated with the cell during operation of the cell in the second mode. The at least one processor may be operable to cause the user equipment to receive the one or more communications from the cell after transmitting the cell WUS.

Some aspects described herein relate to a network node for wireless communication. The network node may include a processing system that includes one or more processors and one or more memories coupled to the one or more processors. The processing system may be configured to cause the network node to receive, from a UE, a cell WUS indicating that a cell associated with the network node is to switch from operating according to a first mode to operating according to a second mode, the cell WUS including an indication of one or more communications to be transmitted to the UE during operation of the cell in the second mode. The at least one processor may be operable to cause the network node to switch the cell from operating according to the first mode to operating according to the second mode based at least in part on the cell WUS. The at least one processor may be operable to cause the network node to transmit the one or more communications to the UE based at least in part on the indication included in the cell WUS.

Some aspects described herein relate to a method of wireless communication performed by a UE. The method may include transmitting a cell WUS indicating that a cell is to switch from operating according to a first mode to operating according to a second mode, the cell WUS including an indication of one or more communications to be transmitted by a network node associated with the cell during operation of the cell in the second mode. The method may include receiving the one or more communications from the cell after transmitting the cell WUS.

Some aspects described herein relate to a method of wireless communication performed by a network node. The method may include receiving, from a UE, a cell WUS indicating that a cell associated with the network node is to switch from operating according to a first mode to operating according to a second mode, the cell WUS including an indication of one or more communications to be transmitted to the UE during operation of the cell in the second mode.

The method may include switching the cell from operating according to the first mode to operating according to the second mode based at least in part on the cell WUS. The method may include transmitting the one or more communications to the UE based at least in part on the indication included in the cell WUS.

Some aspects described herein relate to a non-transitory computer-readable medium that stores a set of instructions for wireless communication by a UE. The set of instructions, when executed by one or more processors of the UE, may cause the UE to transmit a cell WUS indicating that a cell is to switch from operating according to a first mode to operating according to a second mode, the cell WUS including an indication of one or more communications to be transmitted by a network node associated with the cell during operation of the cell in the second mode. The set of instructions, when executed by one or more processors of the UE, may cause the UE to receive the one or more communications from the cell after transmitting the cell WUS.

Some aspects described herein relate to a non-transitory computer-readable medium that stores a set of instructions for wireless communication by a network node. The set of instructions, when executed by one or more processors of the network node, may cause the network node to receive, from a UE, a cell WUS indicating that a cell associated with the network node is to switch from operating according to a first mode to operating according to a second mode, the cell WUS including an indication of one or more communications to be transmitted to the UE during operation of the cell in the second mode. The set of instructions, when executed by one or more processors of the network node, may cause the network node to switch the cell from operating according to the first mode to operating according to the second mode based at least in part on the cell WUS. The set of instructions, when executed by one or more processors of the network node, may cause the network node to transmit the one or more communications to the UE based at least in part on the indication included in the cell WUS.

Some aspects described herein relate to an apparatus for wireless communication. The apparatus may include means for transmitting a cell WUS indicating that a cell is to switch from operating according to a first mode to operating according to a second mode, the cell WUS including an indication of one or more communications to be transmitted by a network node associated with the cell during operation of the cell in the second mode. The apparatus may include means for receiving the one or more communications from the cell after transmitting the cell WUS.

Some aspects described herein relate to an apparatus for wireless communication. The apparatus may include means for receiving, from a UE, a cell WUS indicating that a cell associated with the apparatus is to switch from operating according to a first mode to operating according to a second mode, the cell WUS including an indication of one or more communications to be transmitted to the UE during operation of the cell in the second mode. The apparatus may include means for switching the cell from operating according to the first mode to operating according to the second mode based at least in part on the cell WUS. The apparatus may include means for transmitting the one or more communications to the UE based at least in part on the indication included in the cell WUS.

Aspects generally include a method, apparatus, system, computer program product, non-transitory computer-readable medium, user equipment, base station, network node, network entity, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
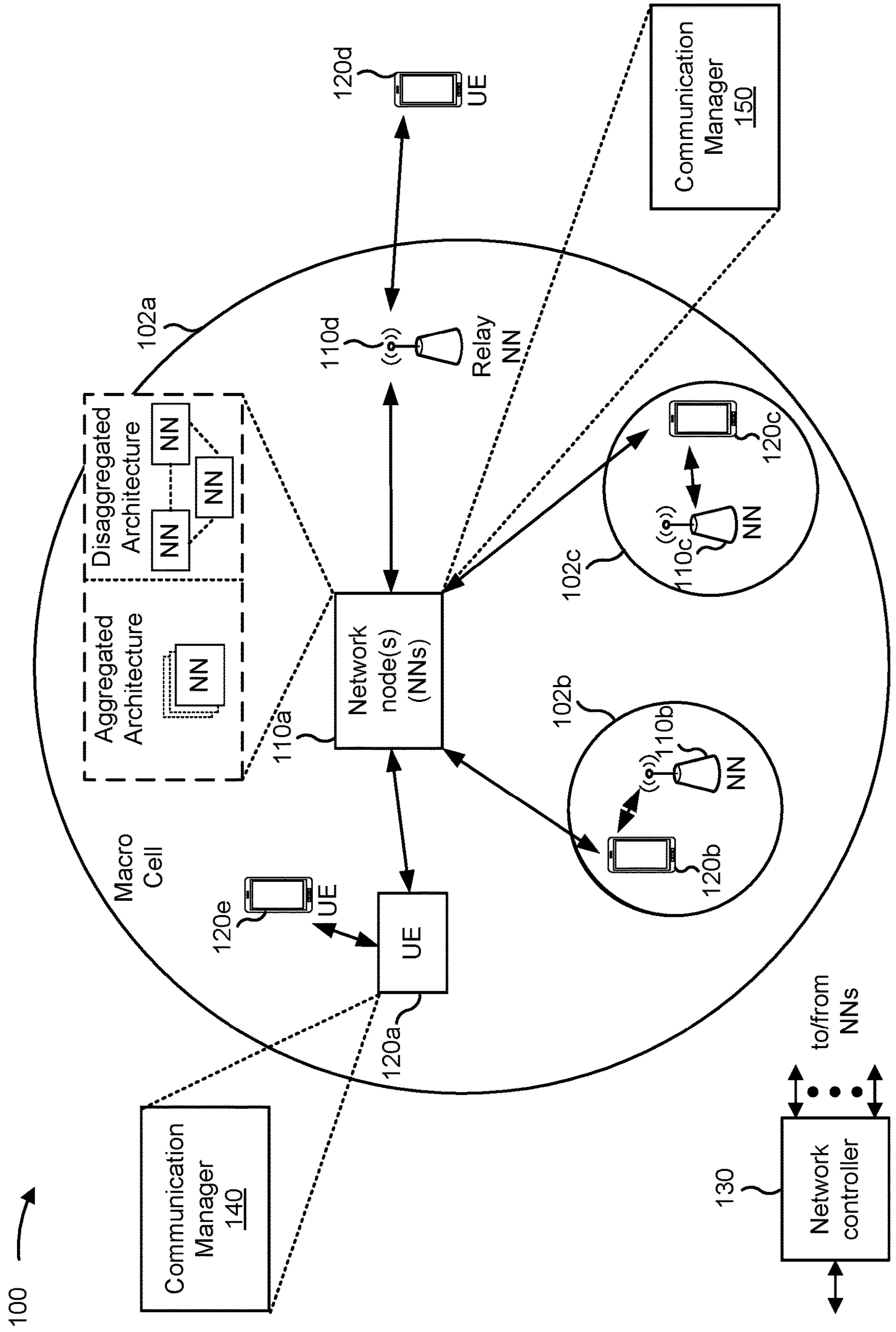
FIG. 1 is a diagram illustrating an example of a wireless network in accordance with the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

Various aspects relate generally to a cell wake-up signal (WUS) for a user equipment (UE) operating according to an idle mode or an inactive mode (herein referred to as an idle/inactive UE). In some aspects, an idle/inactive UE may transmit a cell WUS indicating that a network node is to switch an associated cell from operating according to a first mode to operating according to a second mode, and further including an indication of one or more communications to be transmitted by the network node associated with the cell during operation of the cell in the second mode. In some aspects, the one or more communications indicated in the cell WUS may include communications needed by the idle/inactive UE in order to perform some task (for example, perform cell selection or reselection, transmit an uplink communication, or receive a downlink communication, among other examples). Therefore, the idle/inactive UE may determine which communications to indicate in the cell WUS based at least in part on a need of the idle/inactive UE in association with performing a task. In some aspects, the first mode and the second mode may be energy saving modes, with the second mode providing comparatively less energy savings than the first mode and comparatively more energy savings than a regular or normal operating mode. In some aspects, the network node may receive the cell WUS including the indication of the one or more communications, may switch the cell from operating according to the first mode to operating according to the second mode, and may transmit the one or more communications based at least in part on the indication. Here, by carrying the indication of the one or more communications needed by the idle/inactive UE, the cell WUS enables the network node to transmit communication or perform one or more other operations based at least in part on a need of the idle/inactive UE, which can increase energy savings at the network node, as described herein.

Particular aspects of the subject matter described in this disclosure can be implemented to realize one or more of the following potential advantages. In some examples, the described techniques can be used to increase energy savings of a network node. For example, a cell WUS that includes an indication of one or more communications that an idle/inactive UE needs to be transmitted by the network node enables operation of the cell according to the second mode to be tailored so as to increase energy savings of the network node (for example, by preventing the network node from transmitting communications or performing other operations that are not needed by the idle/inactive UE).

FIG. 1 is a diagram illustrating an example of a wireless network in accordance with the present disclosure. The wireless network 100 may be or may include elements of a 5G (for example, NR) network or a 4G (for example, Long Term Evolution (LTE)) network, among other examples. The wireless network 100 may include one or more network nodes 110 (shown as a network node (NN) 110*a*, a network node 110*b*, a network node 110*c*, and a network node 110*d*), a UE 120 or multiple UEs 120 (shown as a UE 120*a*, a UE 120*b*, a UE 120*c*, a UE 120*d*, and a UE 120*e*), or other network entities. A network node 110 is an entity that communicates with UEs 120. As shown, a network node 110 may include one or more network nodes. For example, a network node 110 may be an aggregated network node, meaning that the aggregated network node is configured to utilize a radio protocol stack that is physically or logically integrated within a single RAN node (for example, within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, or one or more DUs. A network node 110 may include, for example, an NR network node, an LTE network node, a Node B, an eNB (for example, in 4G), a gNB (for example, in 5G), an access point, or a transmission reception point (TRP), a DU, an RU, a CU, a mobility element of a network, a core network node, a network element, a network equipment, or a RAN node. In some examples, the network nodes 110 may be interconnected to one another or to one or more other network nodes 110 in the wireless network 100 through various types of fronthaul, midhaul, or backhaul interfaces, such as a direct physical connection, an air interface, or a virtual network, using any suitable transport network.

Each network node 110 may provide communication coverage for a particular geographic area. In the Third Generation Partnership Project (3GPP), the term "cell" can refer to a coverage area of a network node 110 or a network node subsystem serving this coverage area, depending on the context in which the term is used.

A network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node.

The wireless network 100 may be a heterogeneous network that includes network nodes 110 of different types, such as macro network nodes, pico network nodes, femto network nodes, or relay network nodes. These different types of network nodes 110 may have different transmit power levels, different coverage areas, or different impacts on interference in the wireless network 100. For example, macro network nodes may have a high transmit power level (for example, 5 to 40 watts) whereas pico network nodes, femto network nodes, and relay network nodes may have lower transmit power levels (for example, 0.1 to 2 watts). In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (for example, three) cells. In some examples, a cell may not necessarily be stationary, and the geographic area of the cell may move according to the location of a network node 110 that is mobile (for example, a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

A network controller 130 may couple to or communicate with a set of network nodes 110 and may provide coordination and control for these network nodes 110. The network controller 130 may communicate with the network nodes 110 via a backhaul communication link. The network nodes 110 may communicate with one another directly or indirectly via a wireless or wireline backhaul communication link. In some aspects, the network controller 130 may be a CU or a core network device, or the network controller 130 may include a CU or a core network device.

In some examples, a cell may not necessarily be stationary, and the geographic area of the cell may move in accordance with the location of a network node 110 that is mobile (for example, a mobile network node). In some examples, the network nodes 110 may be interconnected to one another or to one or more other network nodes 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (for example, a network node 110 or a UE 120) and send a transmission of the data to a downstream station (for example, a UE 120 or a network node 110). A relay station may be a UE 120 that can relay transmissions for other UEs 120. In the example shown in FIG. 1, the network node 110*d* (for example, a relay network node) may communicate with the network node 110*a* (for example, a macro network node) and the UE 120*d* in order to facilitate communication between the network node 110*a* and the UE 120*d*. A network node 110 that relays communications may be referred to as a relay station, a relay network node, or a relay.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, a UE function of a network node, or any other suitable device that is configured to communicate via a wireless medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a network node, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any quantity of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as UE 120*a* and UE 120*e*) may communicate directly using one or more sidelink channels (for example, without using a network node 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the network node 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a “Sub-6 GHz” band in various documents and articles. A similar nomenclature issue sometimes occurs in connection with FR2, which is often referred to (interchangeably) as a “millimeter wave” band in documents and articles, despite being different from the extremely high frequency (EHF) band (30 GHz-300 GHz) which is identified by the International Telecommunications Union (ITU) as a “millimeter wave” band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, the term “sub-6 GHz,” if used herein, may broadly represent frequencies that may be less than 6 GHz, may be within FR1, or may include mid-band frequencies. Further, unless specifically stated otherwise, the term “millimeter wave,” if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

In some aspects, the UE 120 may include a communication manager 140. As described in more detail elsewhere herein, the communication manager 140 may transmit a cell WUS indicating that a cell is to switch from operating according to a first mode to operating according to a second mode, the cell WUS including an indication of one or more communications to be transmitted by a network node 110 associated with the cell during operation of the cell in the second mode; and receive the one or more communications from the cell after transmitting the cell WUS. Additionally or alternatively, the communication manager 140 may perform one or more other operations described herein.

In some aspects, the network node 110 may include a communication manager 150. As described in more detail elsewhere herein, the communication manager 150 may receive, from a UE 120, a cell WUS indicating that a cell associated with the network node 110 is to switch from operating according to a first mode to operating according to a second mode, the cell WUS including an indication of one or more communications to be transmitted to the UE 120 during operation of the cell in the second mode; switch the cell from operating according to the first mode to operating according to the second mode based at least in part on the cell WUS; and transmit the one or more communications to the UE 120 based at least in part on the indication included in the cell WUS. Additionally or alternatively, the communication manager 150 may perform one or more other operations described herein.

Figure 2:
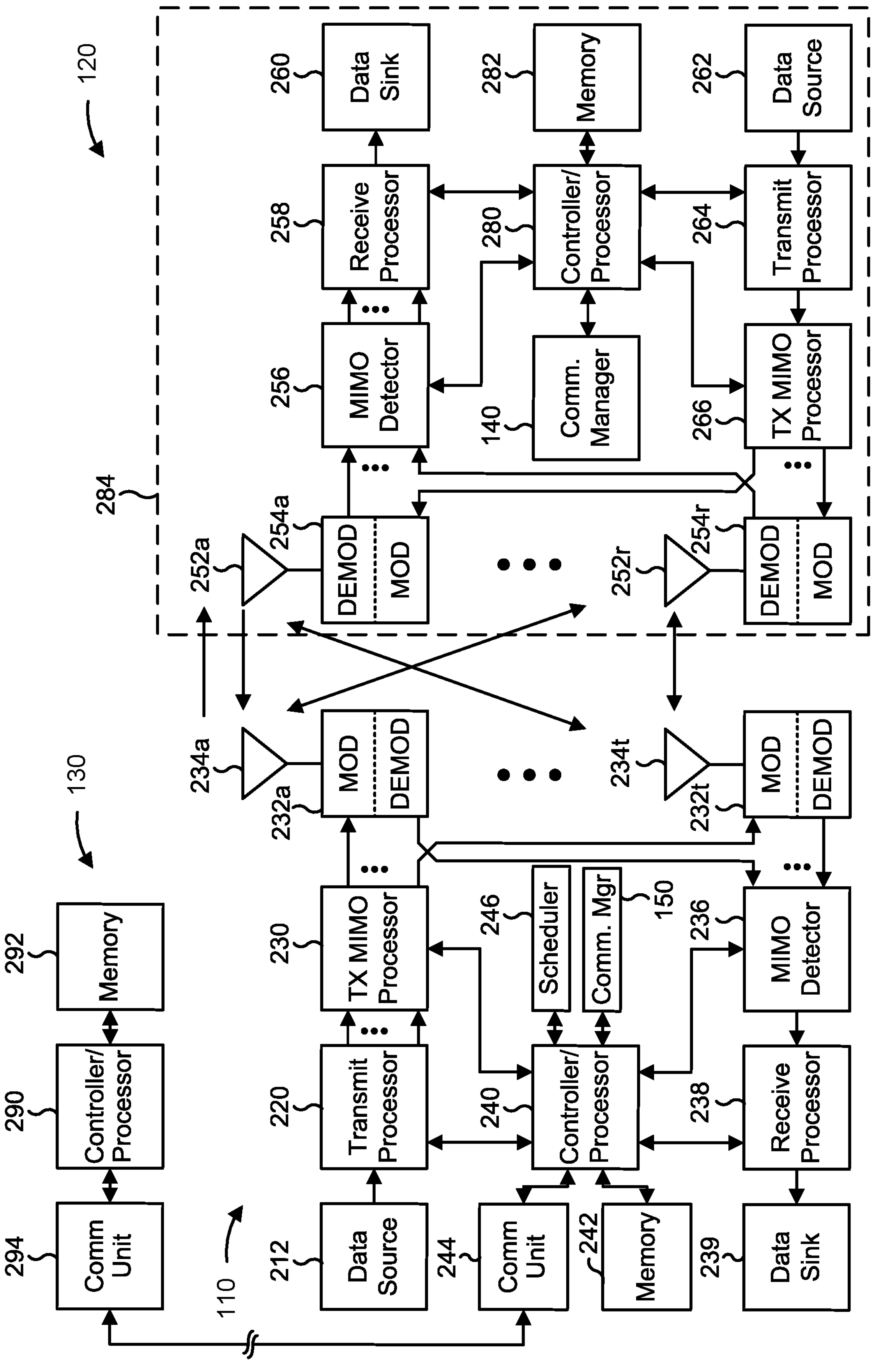
FIG. 2 is a diagram illustrating an example network node in communication with a user equipment (UE) in a wireless network in accordance with the present disclosure.

FIG. 2 is a diagram illustrating an example network node in communication with a UE in a wireless network in accordance with the present disclosure. The network node may correspond to the network node 110 of FIG. 1. Similarly, the UE may correspond to the UE 120 of FIG. 1. The network node 110 may be equipped with a set of antennas 234*a* through 234*t*, such as T antennas (T≥1). The UE 120 may be equipped with a set of antennas 252*a* through 252*r*, such as R antennas (R≥1). The network node 110 of depicted in FIG. 2 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (for example, encode and modulate) the data for the UE 120 based at least in part on the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232*a* through 232*t*. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232*a* through 232*t* may transmit a set of downlink signals (for example, T downlink signals) via a corresponding set of antennas 234 (for example, T antennas), shown as antennas 234*a* through 234*t*.

At the UE 120, a set of antennas 252 (shown as antennas 252*a* through 252*r*) may receive the downlink signals from the network node 110 or other network nodes 110 and may provide a set of received signals (for example, R received signals) to a set of modems 254 (for example, R modems), shown as modems 254*a* through 254*r*. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers or one or more processors. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (for example, antennas 234*a* through 234*t* or antennas 252*a* through 252*r*) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the methods described herein.

At the network node 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the methods described herein.

The controller/processor 240 of the network node 110, the controller/processor 280 of the UE 120, or any other component(s) of FIG. 2 may perform one or more techniques associated with a cell WUS for a UE operating in an idle or inactive mode, as described in more detail elsewhere herein. For example, the controller/processor 240 of the network node 110, the controller/processor 280 of the UE 120, or any other component(s) of FIG. 2 may perform or direct operations of, for example, process 500 of FIG. 5, process 600 of FIG. 6, or other processes as described herein. The memory 242 and the memory 282 may store data and program codes for the network node 110 and the UE 120, respectively. In some examples, the memory 242 or the memory 282 may include a non-transitory computer-readable medium storing one or more instructions (for example, code or program code) for wireless communication. For example, the one or more instructions, when executed (for example, directly, or after compiling, converting, or interpreting) by one or more processors of the network node 110 or the UE 120, may cause the one or more processors, the UE 120, or the network node 110 to perform or direct operations of, for example, process 500 of FIG. 5, process 600 of FIG. 6, or other processes as described herein. In some examples, executing instructions may include running the instructions, converting the instructions, compiling the instructions, or interpreting the instructions, among other examples.

In some aspects, the UE 120 includes means for transmitting a cell WUS indicating that a cell is to switch from operating according to a first mode to operating according to a second mode, the cell WUS including an indication of one or more communications to be transmitted by a network node 110 associated with the cell during operation of the cell in the second mode; or means for receiving the one or more communications from the cell after transmitting the cell WUS. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node 110 includes means for receiving, from a UE 120, a cell WUS indicating that a cell associated with the network node 110 is to switch from operating according to a first mode to operating according to a second mode, the cell WUS including an indication of one or more communications to be transmitted to the UE 120 during operation of the cell in the second mode; means for switching the cell from operating according to the first mode to operating according to the second mode based at least in part on the cell WUS; or means for transmitting the one or more communications to the UE 120 based at least in part on the indication included in the cell WUS. The means for the network node 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. “Network entity” or “network node” may refer to a disaggregated base station, or to one or more units of a disaggregated base station (such as one or more CUs, one or more DUs, or one or more RUs).

An aggregated base station (for example, an aggregated network node) may be configured to utilize a radio protocol stack that is physically or logically integrated within a single RAN node (for example, within a single device or unit). A disaggregated base station (for example, a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
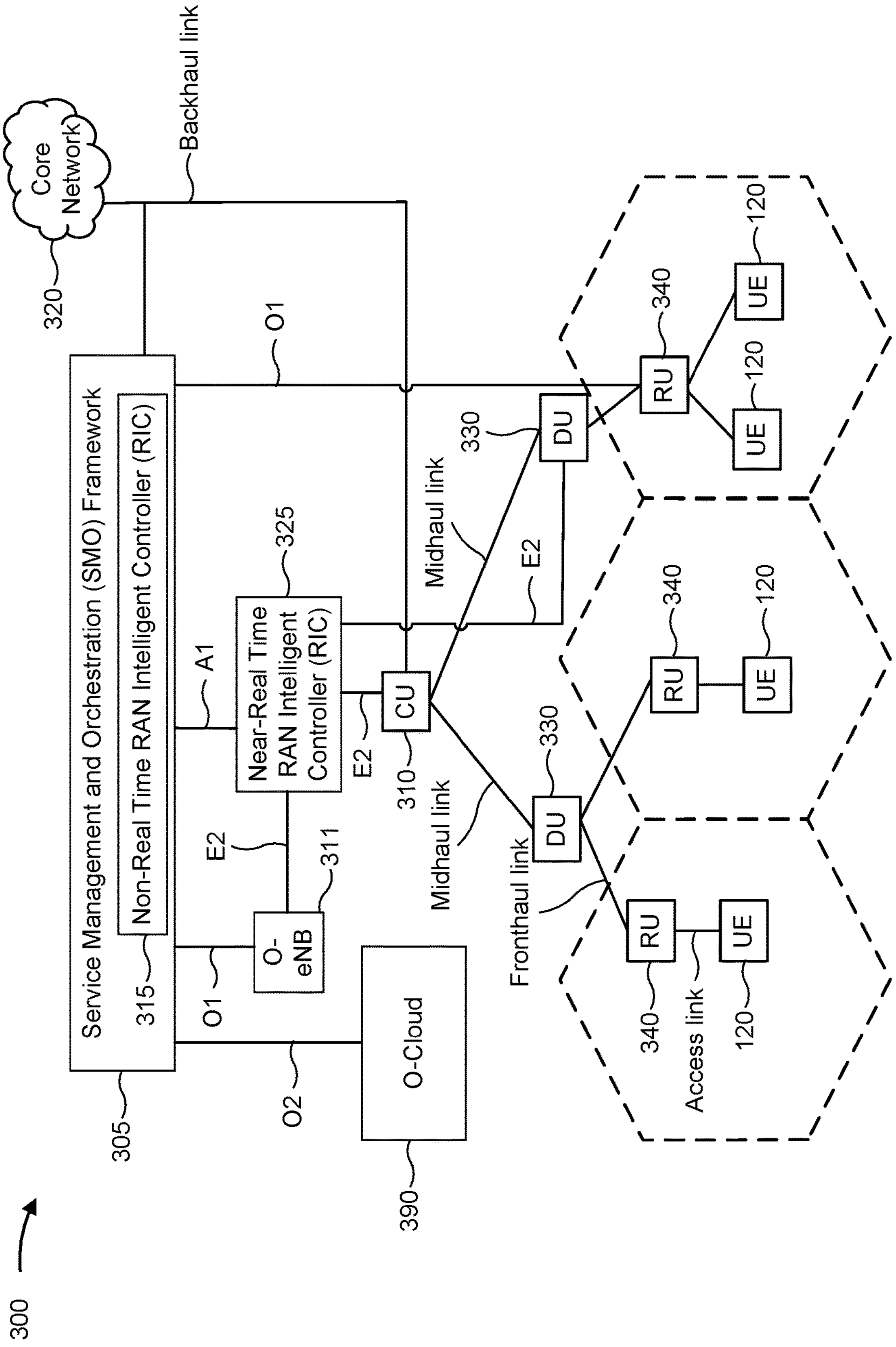
FIG. 3 is a diagram illustrating an example disaggregated base station architecture in accordance with the present disclosure.

FIG. 3 is a diagram illustrating an example disaggregated base station architecture 300 in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as a RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), or control plane functionality (for example, Central Unit-Control Plane (CU-CP) functionality). In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

A wireless communication system may support the use of an uplink signal that can be transmitted by a UE in order to trigger a change in an operation mode of a cell. Such a signal is herein referred to as a cell WUS, but can also be referred to as an uplink WUS or an uplink trigger (ULT). A cell WUS may be utilized to promote network energy saving (NES). For example, if there are no UEs in a cell operating in a connected mode, then a network node may cause the cell to operate according to a first mode (for example, Mode 1). During operation of the cell according to the first mode (for example, according to a first configuration associated with the first mode), the network node may reduce energy usage by, for example, refraining from transmitting synchronization signal blocks (SSBs), transmitting SSBs with an increased periodicity, transmitting a "light" SSB (for example, a beam-sweeping SSB, a discovery reference signal (RS), or a keep-alive signal, among other examples), refraining from transmitting system information (SI), or refraining from performing random access channel (RACH) monitoring, among other examples. Here, a UE may transmit, and the network node may receive, a cell WUS that causes the network node to switch from operating according to the first mode to operating according to a second mode (for example, Mode 2).

During operation of the cell according to the second mode (for example, according to a second configuration associated with the second mode), the network node may perform additional operations associated with the cell (as compared to operating according to the first mode). For example, the network node may transmit SSBs (for example, if not transmitted in the first mode, at a decreased periodicity as compared to the first mode), may transmit one or more items of SI (for example, SI block 1 (SIB1) or one or more other particular SI blocks (SIBs)), or may perform RACH monitoring, among other examples. Notably, operation according to the second mode may still provide energy savings as compared to operation according to a normal mode (for example, Mode 3). In some scenarios, the network node may switch the cell back to operating according to the first mode or to operating according to another mode (for example, Mode 3) after, for example, a configured amount of time operating in the second mode or if a set of configured criteria is satisfied during operation according to the second mode.

In some scenarios, a UE that transmits a cell WUS may be operating according to an idle mode or an inactive mode (herein referred to as an idle/inactive UE). In one example scenario, an idle/inactive UE may need to evaluate the cell for cell selection or reselection in order to determine whether the idle/inactive UE should camp on the cell. In another example scenario, an idle/inactive UE may have uplink communication to transmit to the cell and, therefore, may need to establish an RRC connection to the cell to enable the idle/inactive UE to transmit the uplink communication. In another example scenario, an idle/inactive UE may be camping on another cell (for example, an anchor cell) and may receive a paging message from the other cell indicating that the idle/inactive UE is to establish an RRC connection to the cell in order to receive a downlink communication from the cell. In each of these scenarios, the idle/inactive UE may send a cell WUS to the network node. However, operations that need to be performed by a network node associated with the cell differ among these scenarios. For example, the network node may not need to perform RACH monitoring for the idle/inactive UE that needs to evaluate the cell for cell selection or reselection. As another example, the network node may or may not need to transmit one or more particular SIBs for an idle/inactive UE that needs to establish an RRC connection to the cell (for example, depending on whether the given idle/inactive UE has access to valid SI). Therefore, operation of the cell in the second mode may not provide optimal energy savings, depending on a need of a given idle/inactive UE.

Various aspects relate generally to a cell WUS for an idle/inactive UE. Some aspects more specifically relate to a cell WUS that includes an indication of one or more communications to be transmitted by a network node associated with a cell during operation of the cell in a second mode (for example, Mode 2). In some aspects, an idle/inactive UE may transmit a cell WUS indicating that a network node is to switch an associated cell from operating according to a first mode (for example, Mode 1) to operating according to the second mode, and further including an indication of one or more communications to be transmitted by the network node associated with the cell during operation of the cell in the second mode. In some aspects, the one or more communications indicated in the cell WUS may include communications needed by the idle/inactive UE in order to perform some task (for example, perform cell selection or reselection, transmit an uplink communication, or receive a downlink communication, among other examples). Therefore, the idle/inactive UE may determine which communications to indicate in the cell WUS based at least in part on a need of the idle/inactive UE in association with performing a task. In some aspects, the first mode and the second mode may be energy saving modes, with the second mode providing comparatively less energy savings than the first mode and comparatively more energy savings than a regular or normal operating mode. In some aspects, the network node may receive the cell WUS including the indication of the one or more communications, may switch the cell from operating according to the first mode to operating according to the second mode, and may transmit the one or more communications based at least in part on the indication. Here, by carrying the indication of the one or more communications needed by the idle/inactive UE, the cell WUS enables the network node to transmit communication or perform one or more other operations based at least in part on a need of the idle/inactive UE, which can increase energy savings at the network node, as described herein.

Particular aspects of the subject matter described in this disclosure can be implemented to realize one or more of the following potential advantages. In some examples, the described techniques can be used to increase energy savings of a network node. For example, a cell WUS that includes an indication of one or more communications that an idle/inactive UE needs to be transmitted by the network node enables operation of the cell according to the second mode to be tailored so as to increase energy savings of the network node (for example, by preventing the network node from transmitting communications or performing other operations that are not needed by the idle/inactive UE). As one example, if an idle/inactive UE needs to establish an RRC connection to the cell (for example, to receive a downlink communication or to transmit an uplink communication), then the network node may, during operation of the cell according to the second mode, transmit SIB1, perform RACH monitoring. Here, the network node may refrain from transmitting one or more other SIB s that are not needed by the idle/inactive UE, thereby increasing energy savings of the network node. As another example, if an idle/inactive UE needs only to camp in the cell (without establishing an RRC connection), then the network node may, during operation of the cell according to the second mode, refrain from performing RACH monitoring in the cell, thereby increasing energy savings of the network node. Additional details are provided below.

Figure 4:
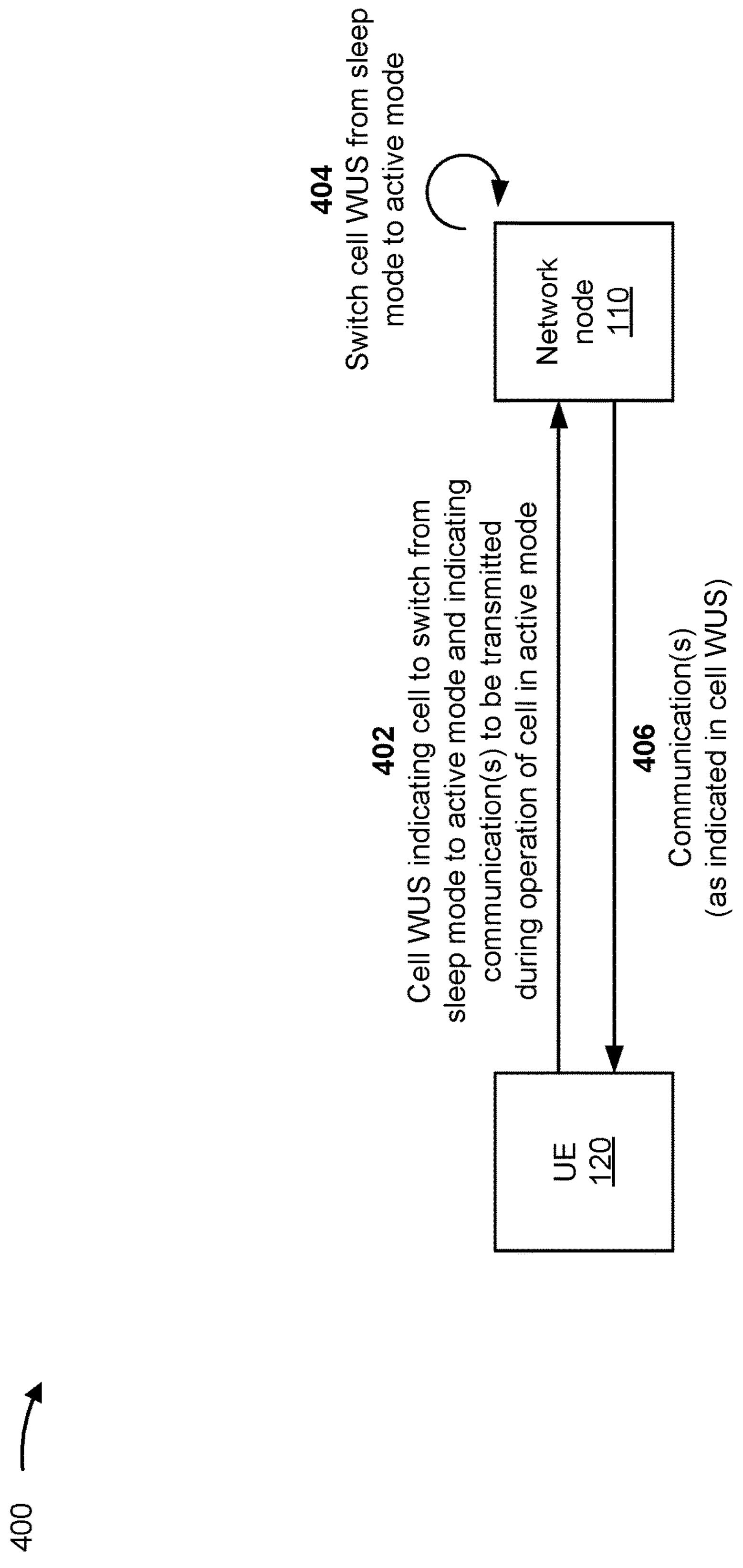
FIG. 4 is a diagram illustrating an example associated with a cell wake-up signal (WUS) for an idle/inactive UE in accordance with the present disclosure.

FIG. 4 is a diagram illustrating an example 400 associated with to a cell WUS for an idle/inactive UE in accordance with the present disclosure. As shown in FIG. 4, example 400 includes communication between a network node 110 and a UE 120. In some aspects, the network node 110 and the UE 120 may be included in a wireless network, such as a wireless network 100. In some aspects, the network node 110 and the UE 120 may communicate via a wireless access link, which may include an uplink and a downlink.

In a first operation 402, the UE 120 may transmit, and the network node 110 may receive, a cell WUS indicating that a cell (for example, a cell supported by the network node 110) is to switch from operating according to a first mode (for example, Mode 1) to operating according to a second mode (for example, Mode 2). In some aspects, the cell WUS includes an indication of one or more communications to be transmitted by the network node 110 during operation of the cell in the second mode.

In some aspects, the UE 120 is operating according to an idle mode (for example, an RRC idle mode) a time at which the UE transmits the cell WUS. Alternatively, the UE 120 is in some aspects operating according to an inactive mode (for example, an RRC inactive mode) at the time at which the UE 120 transmits the cell WUS.

In some aspects, the one or more communications indicated by the cell WUS include an SSB. For example, the network node 110 may be configured such that the network node 110 does not transmit an SSB during operation of the cell according to the first mode. In one example, if the UE 120 needs to evaluate the cell for cell selection or reselection (for example, to determine whether the UE 120 should camp on the cell), then the indication transmitted by the UE 120 in the cell WUS may indicate that the network node 110 is to transmit an SSB during operation according to the second mode. In another example, if the UE 120 needs to establish an RRC connection to the cell (for example, to transmit an uplink communication or to receive a downlink communication), then the indication transmitted by the UE 120 in the cell WUS may indicate that the network node 110 is to transmit an SSB operation according to the second mode. Thus, in some aspects, the UE 120 transmits the indication to cause the network node 110 to transmit an SSB based at least in part on the SSB not being received by the UE 120 during operation of the cell according to the first mode.

In some aspects, the one or more communications indicated by the cell WUS include one or more SIBs. For example, if the UE 120 needs to evaluate the cell for cell selection or reselection, then the indication transmitted by the UE 120 in the cell WUS may indicate that the network node 110 is to transmit SIB1 or one or more other items of SI (for example, one or more particular SIBs). Thus, in some aspects, the UE 120 transmits the indication to cause the network node 110 to transmit SIB1 or one or more other items of based at least in part on a need for the UE 120 to evaluate the cell for a cell selection or reselection. As another example, if the UE 120 needs to establish an RRC connection to the cell (for example, to transmit an uplink communication or to receive a downlink communication after receiving a paging message on another cell), then the indication transmitted by the UE 120 in the cell WUS may indicate that the network node 110 is to transmit SIB1 (for example, when the UE 120 does not have access to valid SI associated with the cell). Thus, in some aspects, the UE 120 transmits the indication to cause the network node 110 to transmit SIB1 based at least in part on the UE 120 not having access to valid SI associated with the cell.

In some aspects, the indication transmitted by the UE 120 in the cell WUS may indicate that the network node 110 is to refrain from transmitting a communication. For example, if the UE 120 needs to establish an RRC connection to the cell (for example, to transmit an uplink communication or to receive a downlink communication after receiving a paging message on another cell), then the indication transmitted by the UE 120 in the cell WUS may indicate that the network node 110 is to refrain from transmitting SIB1 (for example, when the UE 120 has access to valid SI associated with the cell). As another example, if the UE 120 needs to establish an RRC connection to the cell (for example, to transmit an uplink communication or to receive a downlink communication after receiving a paging message on another cell), then the indication transmitted by the UE 120 in the cell WUS may indicate that the network node 110 is to refrain from transmitting one or more items of SI other than SIB1 (for example, when the UE 120 does not have access to valid SI associated with the cell).

In some aspects, the indication transmitted by the UE 120 in the cell WUS may indicate that the network node 110 is to perform one or more operations. For example, if the UE 120 needs to establish an RRC connection to the cell (for example, to transmit an uplink communication or to receive a downlink communication after receiving a paging message on another cell), then the indication transmitted by the UE 120 in the cell WUS may indicate that the network node 110 is to perform RACH monitoring in the cell. As another example, if the UE 120 needs to evaluate the cell for cell selection or reselection, then the indication transmitted by the UE 120 in the cell WUS may indicate that the network node 110 is to perform RACH monitoring (for example, when on-demand SI is supported for the cell). Thus, in some aspects, the UE 120 transmits the indication to cause the network node 110 to perform RACH monitoring based at least in part on a need for the UE 120 to establish an RRC connection to the cell in association with transmitting an uplink communication or receiving a downlink communication after receiving a paging message. Similarly, in some aspects, the network node 110 may refrain from performing RACH monitoring in the cell during operation according to the second mode based at least in part on the indication. In some aspects, the network node 110 may perform RACH monitoring in the cell during operation according to the second mode based at least in part on on-demand SI being supported by the network node 110.

In some aspects, the indication transmitted by the UE 120 in the cell WUS may indicate that the network node 110 is to refrain from performing one or more operations. For example, if the UE 120 needs to evaluate the cell for cell selection or reselection, then the indication transmitted by the UE 120 in the cell WUS may indicate that the network node 110 is to refrain from performing RACH monitoring in the cell (for example, when on-demand SI is not supported for the cell). Thus, in some aspects, the network node 110 may perform RACH monitoring in the cell during operation according to the second mode based at least in part on the indication.

In some aspects, transmitting the cell WUS comprises transmitting a random RACH message, where the RACH message includes the indication of the one or more communications to be transmitted by the network node 110. That is, in some aspects, the indication may be included in a RACH message (for example, MSG1 or msgA, among other examples). In some aspects, the network node 110 may support on-demand SI via RACH messaging. In some such aspects, the indication may cause the network node 110 to perform RACH monitoring. For example, if the network node 110 supports on-demand SI via RACH messaging and the UE 120 needs to evaluate the cell for cell selection or reselection, then the indication transmitted by the UE 120 in the cell WUS may indicate that the network node 110 is to perform RACH monitoring (for example, to enable to the network node 110 to receive a RACH message including a request for one or more particular items of SI, such as one or more SIBs other than SIB1). As another example, if the network node 110 supports on-demand SI via RACH messaging and the UE 120 needs to establish an RRC connection to transmit an uplink communication on the cell, then the indication transmitted by the UE 120 in the cell WUS may indicate that the network node 110 is to perform RACH monitoring (for example, to enable to the network node 110 receive a RACH message including a request for one or more particular items of SI, such as one or more SIBs other than SIB1). As another example, if the network node 110 supports on-demand SI via RACH messaging and the UE 120 needs to establish an RRC connection to receive a downlink communication on the cell (for example, after receiving a paging message on another cell), then the indication transmitted by the UE 120 in the cell WUS may indicate that the network node 110 is to perform RACH monitoring (for example, to enable to the network node 110 receive a RACH message including a request for one or more particular items of SI, such as one or more SIBs other than SIB1).

In some aspects, the cell WUS may serve the purpose of a RACH message, such as a MSG1 associated with a 4-step RACH procedure. Thus, in some such aspects, the one or more communications to be transmitted by the network node 110 during operation of the cell according to the second mode may include a RACH response, such as a MSG2 associated with a 4-step RACH procedure. Additionally or alternatively, the one or more communications to be transmitted by the network node 110 during operation of the cell according to the second mode may include a RACH configuration, as described in further detail below.

In some aspects, the indication transmitted by the UE 120 in the cell WUS may indicate one or more other items of information. For example, the indication may indicate a requested SIB (for example, SIB2, SIB3, a sidelink-related SIB, or a non-terrestrial network (NTN)-related SIB, among other examples). As another example, the indication may indicate a preferred RACH configuration (for example, whether the UE 120 prefers 2-step RACH, whether the UE 120 prefers 4-step RACH, whether the UE 120 prefers RACH MSG1 repetition, whether the UE 120 prefers MSG3 repetition, among other examples). As another example, the indication may indicate a supported RACH configuration (for example, whether the UE 120 supports 2-step RACH, whether the UE 120 supports 4-step RACH, whether the UE 120 supports RACH MSG1 repetition, whether the UE 120 supports MSG3 repetition, among other examples). As another example, the indication may indicate a type of the UE 120 (for example, an indication that the UE is a normal UE, an integrated access and backhaul mobile termination (IAB-MT) entity, a network control repeater mobile termination (NCR-NT) entity, a reduced capability (RedCap) UE, or an NTN UE, among other examples). As another example, the indication may indicate a quality of service (QoS) associated with the UE 120 (for example, an indication of whether the UE 120 expects to transmit or receive low-latency traffic).

In some aspects, the UE 120 may convey the indication via a preamble format associated with the cell WUS, such as via a sequence identity or a cyclic shift value (for example, when a RACH-based cell WUS is used). Additionally or alternatively, the UE 120 may convey the indication via a payload of the cell WUS (for example, when the cell WUS is based on a physical uplink control channel (PUCCH) or a physical uplink shared channel (PUSCH) or in a payload of a RACH message, such as msgA). In one example, the payload can include a single bit indicating whether the UE 120 has uplink data to transmit. Additionally or alternatively, the UE 120 may convey the indication via a time resource in which the cell WUS is transmitted. Additionally or alternatively, the UE 120 may convey the indication via a frequency resource in which the cell WUS UE 120*s* transmitted. Additionally or alternatively, the UE 120 may convey the indication via a scrambling identifier associated with the cell WUS (for example, when an-RS-based cell WUS is configured).

In a second operation 404, the network node 110 may switch the cell from operating according to the first mode to operating according to the second mode based at least in part on the cell WUS. For example, the network node 110 may receive the cell WUS, and may trigger a switch of the cell from operation according to the first mode to operating according to the second mode.

In a third operation 406, the network node 110 may transmit the one or more communications to the UE based at least in part on the indication included in the cell WUS, and the UE 120 may receive the one or more communications from the cell.

In some aspects, the one or more communications may include an SSB. For example, the indication may indicate that the network node 110 is to transmit an SSB as described above with respect to the first operation 402, and the network node 110 may transmit the SSB during operation of the cell according to the second mode based at least in part on the indication.

In some aspects, the one or more communications may include or one or more items of SI, such as SIB1 or one or more other SIB s. For example, the indication may indicate that the network node 110 is to transmit SIB1 as described above with respect to the first operation 402, and the network node 110 may transmit SIB1 during operation of the cell according to the second mode based at least in part on the indication. As another example, the indication may indicate that the network node 110 is to transmit one or more SIBS other than SIB1 as described above with respect to the first operation 402, and the network node 110 may transmit the one or more other SIBs during operation of the cell according to the second mode based at least in part on the indication.

In some aspects, the one or more communications may include a RACH response. For example, the cell WUS may in some aspects serve the purpose of a RACH message, such as a MSG1 associated with a 4-step RACH procedure. Here, the one or more communications to be transmitted by the network node 110 during operation of the cell according to the second mode may include a RACH response, such as a MSG2 associated with a 4-step RACH procedure.

In some aspects, the one or more communications transmitted by the network node 110 during operation of the cell according to the second mode may include a RACH configuration. For example, if the UE 120 needs to establish an RRC connection (for example, to transmit an uplink communication in the cell or to receive a downlink communication in the cell), the network node 110 may select RACH configuration for the UE 120. In some aspects, the network node 110 may measure a characteristic (for example, a timing characteristic or a power characteristic) of the received cell WUS, and may select a RACH configuration based at least in part on a result of the measurement. In some aspects, the RACH configuration may include, for example, a RACH preamble format or a RACH power configuration that is selected so as to improve efficiency in terms of resource overhead for the UE 120. Additionally or alternatively, the RACH configuration may include, for example, RACH occasion resources configured with a (shorter) temporal offset to allow a faster access to the UE 120.

In some aspects, the UE 120 may perform one or more operations based at least in part on the one or more communications received from the network node 110 during operation of the cell according to the second mode. For example, the UE 120 may evaluate the cell for selection or reselection based at least in part on the one or more communications (for example, based at least in part on an SSB, SIB1, or one or more other items of SI). As another example, the UE 120 may camp (or refraining from camp) on the cell based at least in part on the one or more communications (for example, based at least in part on a result of the cell selection or reselection). As another example, the UE 120 may establish an RRC connection to the cell based at least in part on the one or more communications (for example, based at least in part on an SSB and SIB1). In one example, the UE 120 may transmit, and the network node 110 may receive, an uplink communication via the RRC connection. In another example, the network node 110 may transmit, and the UE 120 may receive, a downlink communication via the RRC connection.

Figure 5:
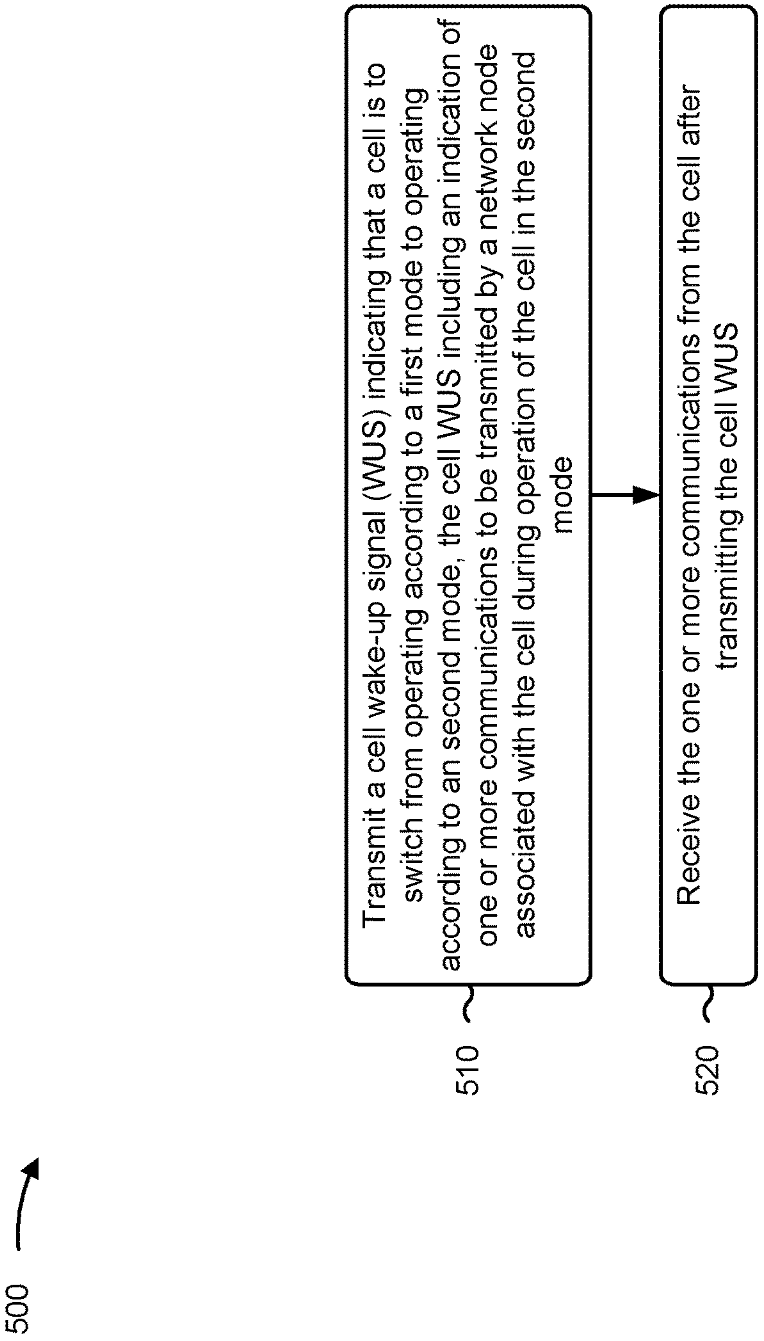
FIG. 5 is a flowchart illustrating an example process performed, for example, by a UE that supports a cell WUS for a UE operating in an idle or inactive mode in accordance with the present disclosure.

FIG. 5 is a flowchart illustrating an example process 500 performed, for example, by a UE that supports a cell WUS for a UE operating in an idle or inactive mode in accordance with the present disclosure. Example process 500 is an example where the UE (for example, UE 120) performs operations associated with a cell WUS for a UE operating in an idle or inactive mode.

As shown in FIG. 5, in some aspects, process 500 may include transmitting a cell WUS indicating that a cell is to switch from operating according to a first mode to operating according to a second mode, the cell WUS including an indication of one or more communications to be transmitted by a network node associated with the cell during operation of the cell in the second mode (block 510). For example, the UE (such as by using communication manager 140 or transmission component 704, depicted in FIG. 7) may transmit a cell WUS indicating that a cell is to switch from operating according to a first mode to operating according to a second mode, the cell WUS including an indication of one or more communications to be transmitted by a network node associated with the cell during operation of the cell in the second mode, as described above.

As further shown in FIG. 5, in some aspects, process 500 may include receiving the one or more communications from the cell after transmitting the cell WUS (block 520). For example, the UE (such as by using communication manager 140 or reception component 702, depicted in FIG. 7) may receive the one or more communications from the cell after transmitting the cell WUS, as described above.

Process 500 may include additional aspects, such as any single aspect or any combination of aspects described below or in connection with one or more other processes described elsewhere herein.

In a first additional aspect, the UE is operating according to an idle mode or an inactive mode at a time at which the UE transmits the cell WUS.

In a second additional aspect, alone or in combination with the first aspect, the one or more communications include an SSB.

In a third additional aspect, alone or in combination with one or more of the first and second aspects, the one or more communications include one or more SIB s.

In a fourth additional aspect, alone or in combination with one or more of the first through third aspects, transmitting the cell WUS comprises transmitting a RACH message, the RACH message indicating the one or more communications to be transmitted by the network node associated with the cell during operation of the cell in the second mode.

In a fifth additional aspect, alone or in combination with one or more of the first through fourth aspects, the one or more communications include a RACH response.

In a sixth additional aspect, alone or in combination with one or more of the first through fifth aspects, the one or more communications include a RACH configuration.

In a seventh additional aspect, alone or in combination with one or more of the first through sixth aspects, transmitting the cell WUS comprises transmitting information indicating at least one of a requested SIB, a preferred RACH configuration, a supported RACH configuration, a type of the UE, or a QoS associated with the UE.

In an eighth additional aspect, alone or in combination with one or more of the first through seventh aspects, the indication is conveyed via at least one of a preamble format associated with the cell WUS, a payload of the cell WUS, a time resource in which the cell WUS is transmitted, a frequency resource in which the cell WUS is transmitted, or a scrambling identifier associated with the cell WUS.

In a ninth additional aspect, alone or in combination with one or more of the first through eighth aspects, process 500 includes evaluating the cell for selection or reselection based at least in part on the one or more communications.

In a tenth additional aspect, alone or in combination with one or more of the first through ninth aspects, process 500 includes camping or refraining from camping on the cell based at least in part on the one or more communications.

In an eleventh additional aspect, alone or in combination with one or more of the first through tenth aspects, process 500 includes establishing a RRC connection to the cell based at least in part on the one or more communications.

In a twelfth additional aspect, alone or in combination with one or more of the first through eleventh aspects, process 500 includes transmitting an uplink communication via the RRC connection or receiving a downlink communication via the RRC connection.

In a thirteenth additional aspect, alone or in combination with one or more of the first through twelfth aspects, transmitting the cell WUS comprises transmitting the indication to cause the network node to transmit an SSB based at least in part on the SSB not being received by the UE during operation of the cell according to the first mode.

In a fourteenth additional aspect, alone or in combination with one or more of the first through thirteenth aspects, transmitting the cell WUS comprises transmitting the indication to cause the network node to transmit SIB1 based at least in part on a need for the UE to evaluate the cell for a cell selection or reselection.

In a fifteenth additional aspect, alone or in combination with one or more of the first through fourteenth aspects, transmitting the cell WUS comprises transmitting the indication to cause the network node to transmit one or more items of system information other than SIB 1.

In a sixteenth additional aspect, alone or in combination with one or more of the first through fifteenth aspects, transmitting the cell WUS comprises transmitting the indication to cause the network node to perform RACH monitoring based at least in part on a need for the UE to establish a RRC connection to the cell in association with transmitting an uplink communication.

In a seventeenth additional aspect, alone or in combination with one or more of the first through sixteenth aspects, transmitting the cell WUS comprises transmitting the indication to cause the network node to transmit SIB1 based at least in part on the UE not having access to valid SI associated with the cell.

In an eighteenth additional aspect, alone or in combination with one or more of the first through seventeenth aspects, process 500 includes receiving a paging message while the UE is camping on the cell, wherein transmitting the cell WUS comprises transmitting the indication to cause the network node to perform RACH monitoring based at least in part on a need for the UE to establish a RRC connection to the cell in association with receiving a downlink communication after receiving the paging message.

Although FIG. 5 shows example blocks of process 500, in some aspects, process 500 may include additional blocks, fewer blocks, different blocks, or differently arranged blocks than those depicted in FIG. 5. Additionally or alternatively, two or more of the blocks of process 500 may be performed in parallel.

Figure 6:
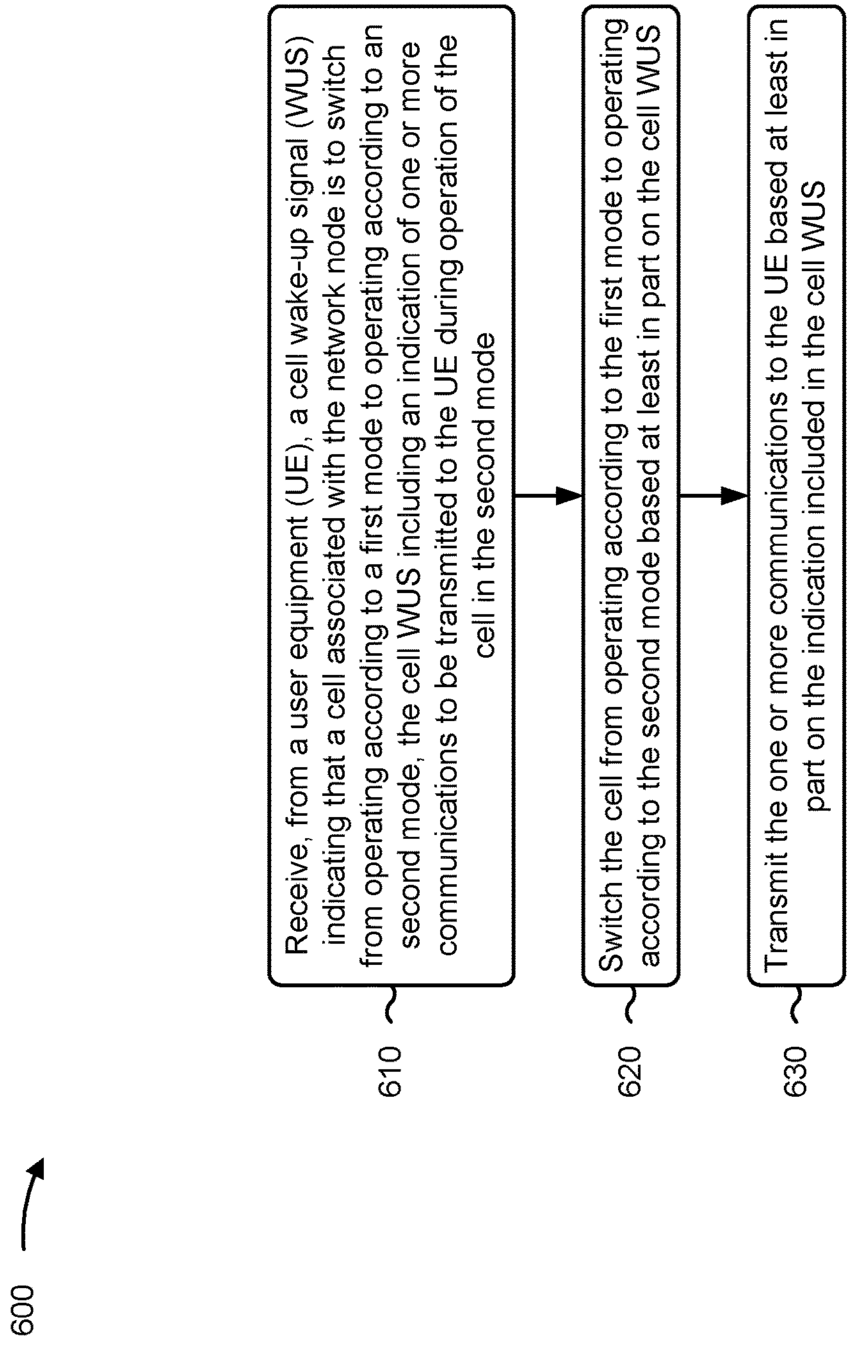
FIG. 6 is a flowchart illustrating an example process performed, for example, by a network node that supports a cell WUS for a UE operating in an idle or inactive mode in accordance with the present disclosure.

FIG. 6 is a flowchart illustrating an example process 600 performed, for example, by a network node that supports a cell WUS for a UE operating in an idle or inactive mode in accordance with the present disclosure. Example process 600 is an example where the network node (for example, network node 110) performs operations associated with supports a cell WUS for a UE operating in an idle or inactive mode.

As shown in FIG. 6, in some aspects, process 600 may include receiving, from a UE, a cell WUS indicating that a cell associated with the network node is to switch from operating according to a first mode to operating according to a second mode, the cell WUS including an indication of one or more communications to be transmitted to the UE during operation of the cell in the second mode (block 610). For example, the network node (such as by using communication manager 150 or reception component 802, depicted in FIG. 8) may receive, from a UE, a cell WUS indicating that a cell associated with the network node is to switch from operating according to a first mode to operating according to a second mode, the cell WUS including an indication of one or more communications to be transmitted to the UE during operation of the cell in the second mode, as described above.

As further shown in FIG. 6, in some aspects, process 600 may include switching the cell from operating according to the first mode to operating according to the second mode based at least in part on the cell WUS (block 620). For example, the network node (such as by using communication manager 150 or communication component 808, depicted in FIG. 8) may switch the cell from operating according to the first mode to operating according to the second mode based at least in part on the cell WUS, as described above.

As further shown in FIG. 6, in some aspects, process 600 may include transmitting the one or more communications to the UE based at least in part on the indication included in the cell WUS (block 630). For example, the network node (such as by using communication manager 150 or transmission component 804, depicted in FIG. 8) may transmit the one or more communications to the UE based at least in part on the indication included in the cell WUS, as described above.

Process 600 may include additional aspects, such as any single aspect or any combination of aspects described below or in connection with one or more other processes described elsewhere herein.

In a first additional aspect, the one or more communications include an SSB.

In a second additional aspect, alone or in combination with the first aspect, the one or more communications include one or more SIB s.

In a third additional aspect, alone or in combination with one or more of the first and second aspects, receiving the cell WUS comprises receiving a RACH message, the RACH message indicating the one or more communications to be transmitted to the UE during operation of the cell in the second mode.

In a fourth additional aspect, alone or in combination with one or more of the first through third aspects, the one or more communications include a RACH response.

In a fifth additional aspect, alone or in combination with one or more of the first through fourth aspects, the one or more communications include a RACH configuration.

In a sixth additional aspect, alone or in combination with one or more of the first through fifth aspects, process 600 includes measuring a characteristic of the cell WUS, and selecting the RACH configuration based at least in part on the characteristic of the cell WUS.

In a seventh additional aspect, alone or in combination with one or more of the first through sixth aspects, receiving the cell WUS comprises receiving information indicating at least one of a requested SIB, a preferred RACH configuration, a supported RACH configuration, a type of the UE, or a QoS associated with the UE.

In an eighth additional aspect, alone or in combination with one or more of the first through seventh aspects, the indication is conveyed via at least one of a preamble format associated with the cell WUS, a payload of the cell WUS, a time resource in which the cell WUS is received, a frequency resource in which the cell WUS is received, or a scrambling identifier associated with the cell WUS.

In a ninth additional aspect, alone or in combination with one or more of the first through eighth aspects, process 600 includes receiving an uplink communication via a RRC connection established based at least in part on the one or more communications or transmitting a downlink communication via the RRC connection established based at least in part on the one or more communications.

In a tenth additional aspect, alone or in combination with one or more of the first through ninth aspects, process 600 includes refraining from performing RACH monitoring based at least in part on the indication.

In an eleventh additional aspect, alone or in combination with one or more of the first through tenth aspects, process 600 includes performing RACH monitoring based at least in part on the indication.

In a twelfth additional aspect, alone or in combination with one or more of the first through eleventh aspects, the RACH monitoring is performed based at least in part on on-demand SI being supported by the network node.

Although FIG. 6 shows example blocks of process 600, in some aspects, process 600 may include additional blocks, fewer blocks, different blocks, or differently arranged blocks than those depicted in FIG. 6. Additionally or alternatively, two or more of the blocks of process 600 may be performed in parallel.

Figure 7:
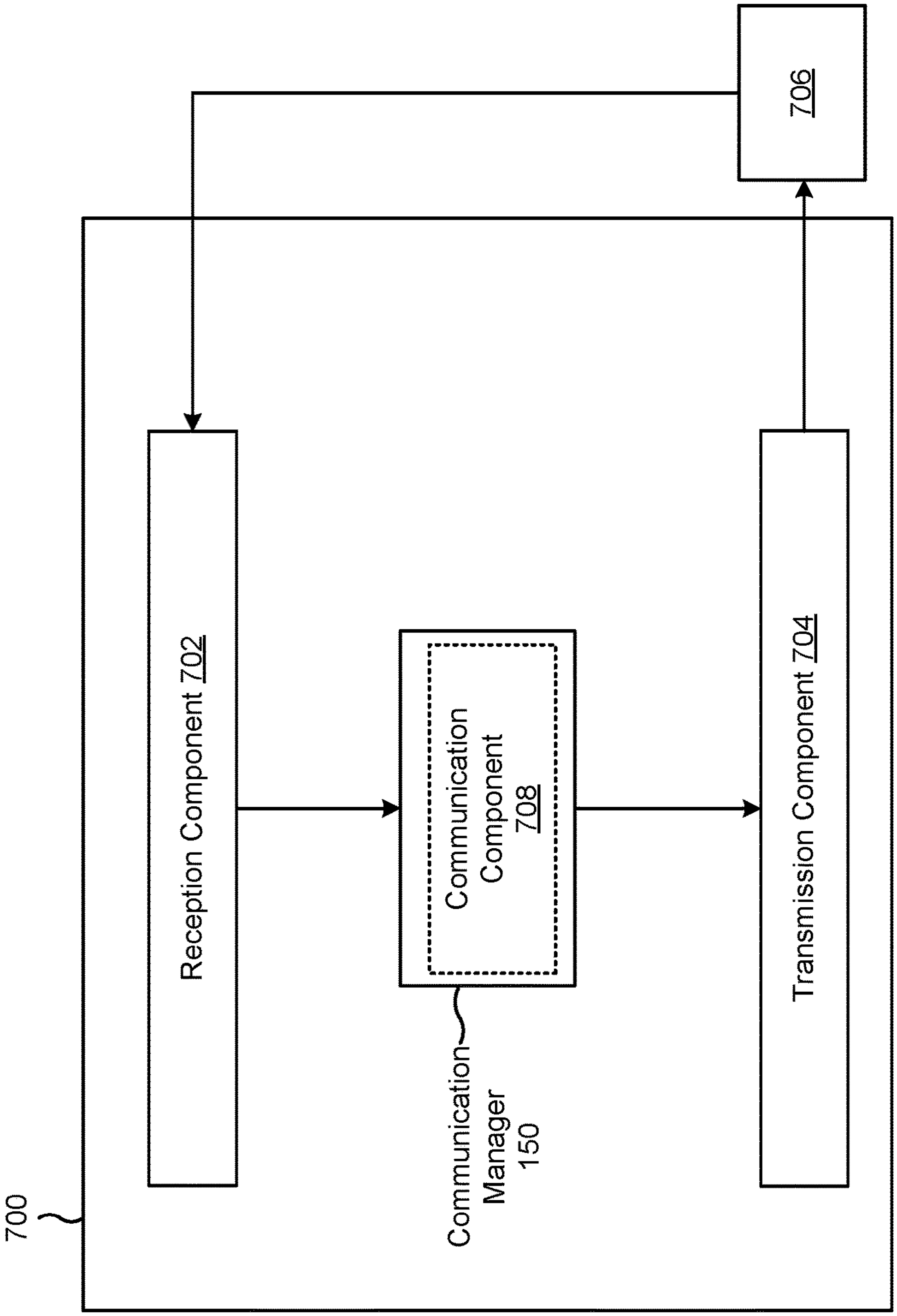
FIG. 7 is a diagram of an example apparatus for wireless communication that supports a cell WUS for a UE operating in an idle or inactive mode in accordance with the present disclosure.

FIG. 7 is a diagram of an example apparatus 700 for wireless communication that supports a cell WUS for a UE operating in an idle or inactive mode in accordance with the present disclosure. The apparatus 700 may be a UE, or a UE may include the apparatus 700. In some aspects, the apparatus 700 includes a reception component 702, a transmission component 704, and a communication manager 140, which may be in communication with one another (for example, via one or more buses). As shown, the apparatus 700 may communicate with another apparatus 706 (such as a UE, a network node, or another wireless communication device) using the reception component 702 and the transmission component 704.

In some aspects, the apparatus 700 may be configured to perform one or more operations described herein in connection with FIG. 4. Additionally or alternatively, the apparatus 700 may be configured to perform one or more processes described herein, such as process 500 of FIG. 5. In some aspects, the apparatus 700 may include one or more components of the UE described above in connection with FIG. 2.

The reception component 702 may receive communications, such as reference signals, control information, or data communications, from the apparatus 706. The reception component 702 may provide received communications to one or more other components of the apparatus 700, such as the communication manager 140. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 702 may include one or more antennas, a modem, a demodulator, a MIMO detector, a receive processor, a controller/processor, or a memory of the UE described above in connection with FIG. 2.

The transmission component 704 may transmit communications, such as reference signals, control information, or data communications, to the apparatus 706. In some aspects, the communication manager 140 may generate communications and may transmit the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modem, a modulator, a transmit MIMO processor, a transmit processor, a controller/processor, or a memory of the UE described above in connection with FIG. 2. In some aspects, the transmission component 704 may be co-located with the reception component 702 in a transceiver.

The communication manager 140 may transmit or may cause the transmission component 704 to transmit a cell WUS indicating that a cell is to switch from operating according to a first mode to operating according to a second mode, the cell WUS including an indication of one or more communications to be transmitted by a network node associated with the cell during operation of the cell in the second mode. The communication manager 140 may receive or may cause the reception component 702 to receive the one or more communications from the cell after transmitting the cell WUS. In some aspects, the communication manager 140 may perform one or more operations described elsewhere herein as being performed by one or more components of the communication manager 140.

The communication manager 140 may include a controller/processor, a memory, of the UE described above in connection with FIG. 2. In some aspects, the communication manager 140 includes a set of components, such as a communication component 708. Alternatively, the set of components may be separate and distinct from the communication manager 140. In some aspects, one or more components of the set of components may include or may be implemented within a controller/processor or a memory of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The transmission component 704 may transmit a cell WUS indicating that a cell is to switch from operating according to a first mode to operating according to a second mode, the cell WUS including an indication of one or more communications to be transmitted by a network node associated with the cell during operation of the cell in the second mode. The reception component 702 may receive the one or more communications from the cell after transmitting the cell WUS.

The communication component 708 may evaluate the cell for selection or reselection based at least in part on the one or more communications.

The communication component 708 may camp or refraining from camping on the cell based at least in part on the one or more communications.

The communication component 708 may establish an RRC connection to the cell based at least in part on the one or more communications.

The transmission component 704 may transmit an uplink communication via the RRC connection or receiving a downlink communication via the RRC connection.

The reception component 702 may receive a paging message while the UE is camping on the cell, wherein transmitting the cell WUS comprises transmitting the indication to cause the network node to perform RACH monitoring based at least in part on a need for the UE to establish an RRC connection to the cell in association with receiving a downlink communication after receiving the paging message.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally or alternatively, a set of (one or more) components shown in FIG. 7 may perform one or more functions described as being performed by another set of components shown in FIG. 7.

Figure 8:
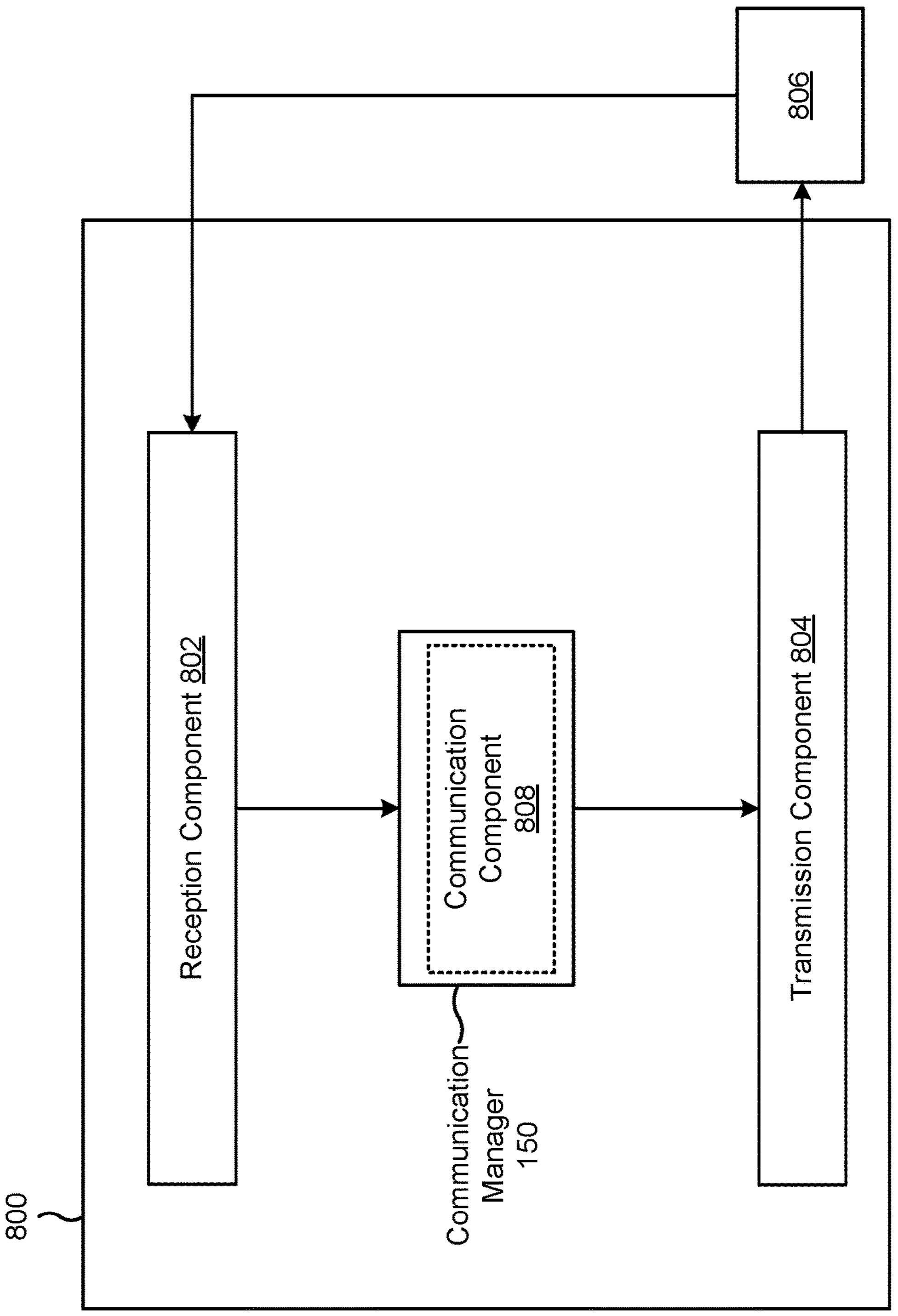
FIG. 8 is a diagram of an example apparatus for wireless communication that supports a cell WUS for a UE operating in an idle or inactive mode in accordance with the present disclosure.

FIG. 8 is a diagram of an example apparatus 800 for wireless communication that supports a cell WUS for a UE operating in an idle or inactive mode in accordance with the present disclosure. The apparatus 800 may be a network node, or a network node may include the apparatus 800. In some aspects, the apparatus 800 includes a reception component 802, a transmission component 804, and a communication manager 150, which may be in communication with one another (for example, via one or more buses). As shown, the apparatus 800 may communicate with another apparatus 806 (such as a UE, a network node, or another wireless communication device) using the reception component 802 and the transmission component 804.

In some aspects, the apparatus 800 may be configured to perform one or more operations described herein in connection with FIG. 4. Additionally or alternatively, the apparatus 800 may be configured to perform one or more processes described herein, such as process 600 of FIG. 6. In some aspects, the apparatus 800 may include one or more components of the network node described above in connection with FIG. 2.

The reception component 802 may receive communications, such as reference signals, control information, or data communications, from the apparatus 806. The reception component 802 may provide received communications to one or more other components of the apparatus 800, such as the communication manager 150. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 802 may include one or more antennas, a modem, a demodulator, a MIMO detector, a receive processor, a controller/processor, or a memory of the network node described above in connection with FIG. 2.

The transmission component 804 may transmit communications, such as reference signals, control information, or data communications, to the apparatus 806. In some aspects, the communication manager 150 may generate communications and may transmit the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, or a memory of the network node described above in connection with FIG. 2. In some aspects, the transmission component 804 may be co-located with the reception component 802 in a transceiver.

The communication manager 150 may receive or may cause the reception component 802 to receive, from a UE, a cell WUS indicating that a cell associated with the network node is to switch from operating according to a first mode to operating according to a second mode, the cell WUS including an indication of one or more communications to be transmitted to the UE during operation of the cell in the second mode. The communication manager 150 may switch the cell from operating according to the first mode to operating according to the second mode based at least in part on the cell WUS. The communication manager 150 may transmit or may cause the transmission component 804 to transmit the one or more communications to the UE based at least in part on the indication included in the cell WUS. In some aspects, the communication manager 150 may perform one or more operations described elsewhere herein as being performed by one or more components of the communication manager 150.

The communication manager 150 may include a controller/processor, a memory, a scheduler, or a communication unit of the network node described above in connection with FIG. 2. In some aspects, the communication manager 150 includes a set of components, such as a communication component 808. Alternatively, the set of components may be separate and distinct from the communication manager 150. In some aspects, one or more components of the set of components may include or may be implemented within a controller/processor, a memory, a scheduler, or a communication unit of the network node described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive, from a UE, a cell WUS indicating that a cell associated with the network node is to switch from operating according to a first mode to operating according to a second mode, the cell WUS including an indication of one or more communications to be transmitted to the UE during operation of the cell in the second mode. The communication component 808 may switch the cell from operating according to the first mode to operating according to the second mode based at least in part on the cell WUS. The transmission component 804 may transmit the one or more communications to the UE based at least in part on the indication included in the cell WUS.

The communication component 808 may measure a characteristic of the cell WUS.

The communication component 808 may select the RACH configuration based at least in part on the characteristic of the cell WUS.

The reception component 802 may receive an uplink communication via a RRC connection established based at least in part on the one or more communications or transmitting a downlink communication via the RRC connection established based at least in part on the one or more communications.

The communication component 808 may refrain from performing RACH monitoring based at least in part on the indication.

The communication component 808 may perform RACH monitoring based at least in part on the indication.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a UE, comprising: transmitting a cell WUS indicating that a cell is to switch from operating according to a first mode to operating according to a second mode, the cell WUS including an indication of one or more communications to be transmitted by a network node associated with the cell during operation of the cell in the second mode; and receiving the one or more communications from the cell after transmitting the cell WUS.

Aspect 2: The method of Aspect 1, wherein the UE is operating according to an idle mode or an inactive mode at a time at which the UE transmits the cell WUS.

Aspect 3: The method of any of Aspects 1-2, wherein the one or more communications include an SSB.

Aspect 4: The method of any of Aspects 1-3, wherein the one or more communications include one or more SIB s.

Aspect 5: The method of any of Aspects 1-4, wherein transmitting the cell WUS comprises transmitting a RACH message, the RACH message indicating the one or more communications to be transmitted by the network node associated with the cell during operation of the cell in the second mode.

Aspect 6: The method of Aspect 5, wherein the one or more communications include a RACH response.

Aspect 7: The method of any of Aspects 1-6, wherein the one or more communications include a RACH configuration.

Aspect 8: The method of any of Aspects 1-7, wherein transmitting the cell WUS comprises transmitting information indicating at least one of: a requested SIB, a preferred RACH configuration, a supported RACH configuration, a type of the UE, or a QoS associated with the UE.

Aspect 9: The method of any of Aspects 1-8, wherein the indication is conveyed via at least one of a preamble format associated with the cell WUS, a payload of the cell WUS, a time resource in which the cell WUS is transmitted, a frequency resource in which the cell WUS is transmitted, or a scrambling identifier associated with the cell WUS.

Aspect 10: The method of any of Aspects 1-9, further comprising evaluating the cell for selection or reselection based at least in part on the one or more communications.

Aspect 11: The method of any of Aspects 1-10, further comprising camping or refraining from camping on the cell based at least in part on the one or more communications.

Aspect 12: The method of any of Aspects 1-11, further comprising establishing a RRC connection to the cell based at least in part on the one or more communications.

Aspect 13: The method of Aspect 12, further comprising transmitting an uplink communication via the RRC connection or receiving a downlink communication via the RRC connection.

Aspect 14: The method of any of Aspects 1-13, wherein transmitting the cell WUS comprises transmitting the indication to cause the network node to transmit an SSB based at least in part on the SSB not being received by the UE during operation of the cell according to the first mode.

Aspect 15: The method of any of Aspects 1-14, wherein transmitting the cell WUS comprises transmitting the indication to cause the network node to transmit SIB1 based at least in part on a need for the UE to evaluate the cell for a cell selection or reselection.

Aspect 16: The method of Aspect 15, wherein transmitting the cell WUS comprises transmitting the indication to cause the network node to transmit one or more items of system information other than SIB1.

Aspect 17: The method of any of Aspects 1-16, wherein transmitting the cell WUS comprises transmitting the indication to cause the network node to perform RACH monitoring based at least in part on a need for the UE to establish a RRC connection to the cell in association with transmitting an uplink communication.

Aspect 18: The method of Aspect 17, wherein transmitting the cell WUS comprises transmitting the indication to cause the network node to transmit SIB1 based at least in part on the UE not having access to valid SI associated with the cell.

Aspect 19: The method of any of Aspects 1-18, further comprising receiving a paging message while the UE is camping on the cell, wherein transmitting the cell WUS comprises transmitting the indication to cause the network node to perform RACH monitoring based at least in part on a need for the UE to establish a RRC connection to the cell in association with receiving a downlink communication after receiving the paging message.

Aspect 20: A method of wireless communication performed by a network node, comprising: receiving, from a UE, a cell WUS indicating that a cell associated with the network node is to switch from operating according to a first mode to operating according to a second mode, the cell WUS including an indication of one or more communications to be transmitted to the UE during operation of the cell in the second mode; switching the cell from operating according to the first mode to operating according to the second mode based at least in part on the cell WUS; and transmitting the one or more communications to the UE based at least in part on the indication included in the cell WUS.

Aspect 21: The method of Aspect 20, wherein the one or more communications include an SSB.

Aspect 22: The method of any of Aspects 20-21, wherein the one or more communications include one or more SIBs.

Aspect 23: The method of any of Aspects 20-22, wherein receiving the cell WUS comprises receiving a RACH message, the RACH message indicating the one or more communications to be transmitted to the UE during operation of the cell in the second mode.

Aspect 24: The method of Aspect 23, wherein the one or more communications include a RACH response.

Aspect 25: The method of any of Aspects 20-24, wherein the one or more communications include a RACH configuration.

Aspect 26: The method of Aspect 25, further comprising: measuring a characteristic of the cell WUS; and selecting the RACH configuration based at least in part on the characteristic of the cell WUS.

Aspect 27: The method of any of Aspects 20-26, wherein receiving the cell WUS comprises receiving information indicating at least one of: a requested SIB, a preferred RACH configuration, a supported RACH configuration, a type of the UE, or a QoS associated with the UE.

Aspect 28: The method of any of Aspects 20-27, wherein the indication is conveyed via at least one of a preamble format associated with the cell WUS, a payload of the cell WUS, a time resource in which the cell WUS is received, a frequency resource in which the cell WUS is received, or a scrambling identifier associated with the cell WUS.

Aspect 29: The method of any of Aspects 20-28, further comprising receiving an uplink communication via a RRC connection established based at least in part on the one or more communications or transmitting a downlink communication via the RRC connection established based at least in part on the one or more communications.

Aspect 30: The method of any of Aspects 20-29, further comprising refraining from performing RACH monitoring based at least in part on the indication.

Aspect 31: The method of any of Aspects 20-30, further comprising performing RACH monitoring based at least in part on the indication.

Aspect 32: The method of Aspect 31, wherein the RACH monitoring is performed based at least in part on on-demand SI being supported by the network node.

Aspect 33: An apparatus for wireless communication at a device, comprising a processor; memory coupled with the processor; and instructions stored in the memory and executable by the processor to cause the apparatus to perform the method of one or more of Aspects 1-32.

Aspect 34: A device for wireless communication, comprising a memory and one or more processors coupled to the memory, the one or more processors configured to perform the method of one or more of Aspects 1-32.

Aspect 35: An apparatus for wireless communication, comprising at least one means for performing the method of one or more of Aspects 1-32.

Aspect 36: A non-transitory computer-readable medium storing code for wireless communication, the code comprising instructions executable by a processor to perform the method of one or more of Aspects 1-32.

Aspect 37: A non-transitory computer-readable medium storing a set of instructions for wireless communication, the set of instructions comprising one or more instructions that, when executed by one or more processors of a device, cause the device to perform the method of one or more of Aspects 1-32.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (for example, if used in combination with "either" or "only one of").

What is claimed is:

1. A user equipment (UE) for wireless communication, comprising:

a processing system that includes one or more processors and one or more memories coupled to the one or more processors, the processing system configured to cause the UE to:

transmit, to a network node, a cell wake-up signal (WUS) indicating that the network node is to switch from operating a cell according to a first mode to operating according to a second mode, the cell WUS including an indication that the network node is to refrain from transmitting one or more communications to the UE while the network node is operating the cell according to the second mode; and transmit, to the cell and after transmitting the cell WUS, a communication associated with establishing a radio resource control (RRC) connection.

2. The UE of claim 1, wherein the UE is operating according to an idle mode or an inactive mode at a time at which the UE transmits the cell WUS.

3. The UE of claim 1, wherein the one or more communications include at least one of a synchronization signal block (SSB) or one or more system information blocks (SIBs).

4. The UE of claim 1, wherein, to cause the UE to transmit the cell WUS, the processing system is configured to cause the UE to transmit a random access channel (RACH) message, the RACH message indicating the one or more communications.

5. The UE of claim 1, wherein the one or more communications include at least one of a random access channel (RACH) response or a RACH configuration.

6. The UE of claim 1, wherein, to cause the UE to transmit the cell WUS, the processing system is configured to cause the UE to transmit information indicating at least one of: a requested system information block (SIB), a preferred random access channel (RACH) configuration, a supported RACH configuration, a type of the UE, or a quality of service (QOS) associated with the UE.

7. The UE of claim 1, wherein the indication is conveyed via at least one of a preamble format associated with the cell WUS, a payload of the cell WUS, a time resource in which the cell WUS is transmitted, a frequency resource in which the cell WUS is transmitted, or a scrambling identifier associated with the cell WUS.

8. The UE of claim 1, wherein the processing system is further operable to cause the UE to evaluate the cell for selection or reselection.

9. The UE of claim 1, wherein the processing system is further operable to cause the UE to camp or refraining from camping on the cell.

10. The UE of claim 1, wherein the processing system is further operable to cause the UE to:

establish the RRC connection to the cell; and transmit an uplink communication via the RRC connection or receive a downlink communication via the RRC connection.

11. The UE of claim 1, wherein the processing system is further operable to cause the UE to transmit another indication to cause the network node to transmit a synchronization signal block (SSB) based at least in part on the SSB not being received by the UE during operation of the cell according to the first mode.

12. The UE of claim 1, wherein the processing system is further operable to cause the UE to transmit another indication to cause the network node to transmit system information block 1 (SIB1) based at least in part on a need for the UE to evaluate the cell for a cell selection or reselection.

13. The UE of claim 12, wherein, to cause the UE to transmit the cell WUS, the processing system is configured to cause the UE to transmit the other indication to cause the network node to transmit one or more items of system information other than SIB1.

14. The UE of claim 1, wherein, to cause the UE to transmit the cell WUS, the processing system is configured to cause the UE to transmit the other indication to cause the network node to perform random access channel (RACH) monitoring based at least in part on a need for the UE to establish the RRC connection to the cell in association with transmitting an uplink communication.

15. The UE of claim 14, wherein, to cause the UE to transmit the cell WUS, the processing system is configured to cause the UE to transmit the other indication to cause the network node to transmit system information block 1 (SIB1) based at least in part on the UE not having access to valid system information (SI) associated with the cell.

16. The UE of claim 1, wherein the processing system is further operable to cause the UE to receive a paging message while the UE is camping on the cell, wherein transmitting the cell WUS comprises transmitting the indication to cause the network node to perform random access channel (RACH) monitoring based at least in part on a need for the UE to establish the RRC connection to the cell in association with receiving a downlink communication after receiving the paging message.

17. The UE of claim 1, wherein the processing system is further configured to cause the UE to receive a paging message from another cell prior to transmission of the cell WUS; and wherein, to cause the UE to transmit the cell WUS, the processing system is further configured to cause the UE to transmit the cell WUS based at least in part on receipt of the paging message from the other cell.

18. A network node for wireless communication, comprising:

a processing system that includes one or more processors and one or more memories coupled to the one or more processors, the processing system configured to cause the network node to:

receive, from a user equipment (UE), a cell wake-up signal (WUS) indicating that the network node is to switch from operating a cell according to a first mode to operating the cell according to a second mode, the cell WUS including an indication that the network node is to refrain from transmitting one or more communications to the UE while the network node is operating the cell according to the second mode;

switch the cell from operating according to the first mode to operating according to the second mode based at least in part on the cell WUS; and receive, from the UE and after the WUS is received, a communication associated with establishing a radio resource control (RRC) connection.

19. The network node of claim 18, wherein, to cause the network node to receive the cell WUS, the processing system is configured to cause the network node to receive a random access channel (RACH) message, the RACH message indicating the one or more communications.

20. The network node of claim 19, wherein the one or more communications include at least one of a RACH response or a RACH configuration.

21. The network node of claim 18, wherein, to cause the network node to receive the cell WUS, the processing system is configured to cause the network node to receive information indicating at least one of: a requested system information block (SIB), a preferred random access channel (RACH) configuration, a supported RACH configuration, a type of the UE, or a quality of service (QoS) associated with the UE.

22. The network node of claim 18, wherein the indication is conveyed via at least one of a preamble format associated with the cell WUS, a payload of the cell WUS, a time resource in which the cell WUS is received, a frequency resource in which the cell WUS is received, or a scrambling identifier associated with the cell WUS.

23. The network node of claim 18, wherein the processing system is further operable cause the network node to receive an uplink communication via the RRC connection or transmit a downlink communication via the RRC connection.

24. The network node of claim 18, wherein the processing system is further operable to cause the network node to refrain from performing random access channel (RACH) monitoring based at least in part on the indication.

25. The network node of claim 18, wherein the processing system is further operable to cause the network node to perform random access channel (RACH) monitoring based at least in part on another indication.

26. A method of wireless communication performed by a user equipment (UE), comprising:

transmitting, to a network node, a cell wake-up signal (WUS) indicating that the network node is to switch from operating a cell according to a first mode to operating the cell according to a second mode, the cell WUS including an indication that a network node is to refrain from transmitting one or more communications to the UE while the network node is operating the cell according to the second mode; and transmitting, to the cell and after transmitting the cell WUS, a communication associated with establishing a radio resource control (RRC) connection.

27. The method of claim 26, wherein the UE is operating according to an idle mode or an inactive mode at a time at which the UE transmits the cell WUS.

28. The method of claim 26, further comprising:

receiving a paging message from another cell prior to transmitting the cell WUS; and wherein transmitting the cell WUS further comprises transmitting the cell WUS based at least in part on receiving the paging message from the other cell.

29. A method of wireless communication performed by a network node, comprising:

receiving, from a user equipment (UE), a cell wake-up signal (WUS) indicating that the network node is to switch from operating a cell according to a first mode to operating the cell according to a second mode, the cell WUS including an indication that the network node is to refrain from transmitting one or more communications to the UE while the network node is operating the cell according to the second mode;

switching the cell from operating according to the first mode to operating according to the second mode based at least in part on the cell WUS; and receiving, from the UE and after receiving the WUS, a communication associated with establishing a radio resource control (RRC) connection.

30. The method of claim 29, wherein the one or more communications include at least one of a synchronization signal block (SSB), one or more system information blocks (SIBs), a random access channel (RACH) response, or a RACH configuration.

* * * * *